(12) United States Patent
Arcas et al.

(10) Patent No.: US 9,973,697 B2
(45) Date of Patent: May 15, 2018

(54) IMAGE CAPTURE AND ORDERING

(71) Applicant: Microsoft Technology Licensing, LLC, Redmond, WA (US)

(72) Inventors: Blaise Aguera y Arcas, Seattle, WA (US); Markus Unger, Graz (AT); Donald A. Barnett, Monroe, WA (US); David Maxwell Gedye, Seattle, WA (US); Sudipta Narayan Sinha, Redmond, WA (US); Eric Joel Stollnitz, Kirkland, WA (US); Johannes Kopf, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/603,568

(22) Filed: May 24, 2017

(65) Prior Publication Data
US 2017/0257565 A1    Sep. 7, 2017

Related U.S. Application Data

(63) Continuation of application No. 13/826,091, filed on Mar. 14, 2013, now Pat. No. 9,712,746.

(51) Int. Cl.
*H04N 5/00* (2011.01)
*H04N 5/232* (2006.01)
*G06T 3/40* (2006.01)

(52) U.S. Cl.
CPC ....... *H04N 5/23238* (2013.01); *G06T 3/4038* (2013.01)

(58) Field of Classification Search
CPC .......... H04N 9/43; G01N 21/21; G01S 7/499; G01S 11/12; G01S 17/02
See application file for complete search history.

(56) References Cited

U.S. PATENT DOCUMENTS 6,044,181 A    3/2000  Szeliski et al.
6,084,592 A    7/2000  Shum et al.
(Continued)

FOREIGN PATENT DOCUMENTS

CN    101119442 A    2/2008
CN    101681525      3/2010
(Continued)

OTHER PUBLICATIONS

"An Interactive Editing Tool for Correcting Panoramas", Jun Hong Gao and Michels. Brown, Nov. 28, 2012, ACM, Siggraph Asia 2012 Technical Briefs, 4 pgs.
(Continued)

*Primary Examiner* — Frank Huang
(74) *Attorney, Agent, or Firm* — Merchant & Gould P.C.

(57) ABSTRACT

One or more techniques and/or systems are provided for ordering images for panorama stitching and/or for providing a focal point indicator for image capture. For example, one or more images, which may be stitched together to create a panorama of a scene, may be stored within an image stack according to one or more ordering preferences, such as where manually captured images are stored within a first/higher priority region of the image stack as compared to automatically captured images. One or more images within the image stack may be stitched according to a stitching order to create the panorama, such as using images in the first region for a foreground of the panorama. Also, a current position of a camera may be tracked and compared with a focal point of a scene to generate a focal point indicator to assist with capturing a new/current image of the scene.

20 Claims, 10 Drawing Sheets

(56) References Cited

U.S. PATENT DOCUMENTS

| | | | |
|---|---|---|---|
| 6,167,151 | A | 12/2000 | Albeck |
| 6,222,555 | B1 | 4/2001 | Christofferson et al. |
| 6,246,412 | B1 | 6/2001 | Shum et al. |
| 6,271,855 | B1 | 8/2001 | Shum et al. |
| 6,359,617 | B1 | 3/2002 | Xiong |
| 6,456,323 | B1 | 9/2002 | Mancuso et al. |
| 6,639,596 | B1 | 10/2003 | Shum et al. |
| 6,762,769 | B2 | 7/2004 | Guo et al. |
| 6,771,304 | B1 | 8/2004 | Mancuso |
| 6,885,392 | B1 | 4/2005 | Mancuso |
| 6,905,218 | B2 | 6/2005 | Courchesne |
| 7,006,124 | B2 | 2/2006 | Peleg et al. |
| 7,010,158 | B2 | 3/2006 | Cahill |
| 7,095,905 | B1 | 8/2006 | Peterson |
| 7,248,738 | B2 | 7/2007 | Ho et al. |
| 7,580,952 | B2 | 8/2009 | Logan et al. |
| 7,583,288 | B2 | 9/2009 | Uyttendaele et al. |
| 7,683,948 | B2 | 3/2010 | Yanof et al. |
| 7,936,915 | B2 | 5/2011 | Brown et al. |
| 8,064,559 | B2 | 11/2011 | Denk et al. |
| 8,249,390 | B2 | 8/2012 | Park et al. |
| 8,250,476 | B2 | 8/2012 | Hamilton, II et al. |
| 8,264,504 | B2 | 9/2012 | Naimark |
| 8,350,850 | B2 | 1/2013 | Steedly et al. |
| 8,620,095 | B2 | 12/2013 | Sinha et al. |
| 8,751,156 | B2 | 6/2014 | Musabji et al. |
| 8,787,700 | B1 | 7/2014 | Aly et al. |
| 9,196,072 | B2 | 11/2015 | Oh et al. |
| 9,305,371 | B2 | 4/2016 | Arcas et al. |
| 2004/0104935 | A1 | 6/2004 | Williamson et al. |
| 2004/0189849 | A1 | 9/2004 | Hofer |
| 2005/0062869 | A1 | 3/2005 | Zimmermann et al. |
| 2006/0132482 | A1 | 6/2006 | Oh |
| 2007/0008312 | A1 | 1/2007 | Zhou et al. |
| 2007/0236514 | A1 | 10/2007 | Agusanto et al. |
| 2008/0143820 | A1* | 6/2008 | Peterson ............... G06T 3/4038 348/36 |
| 2008/0247667 | A1 | 10/2008 | Jin |
| 2009/0130762 | A1 | 5/2009 | Poliard et al. |
| 2009/0141966 | A1 | 6/2009 | Chen et al. |
| 2009/0244062 | A1 | 10/2009 | Steedly et al. |
| 2010/0315412 | A1 | 12/2010 | Sinha et al. |
| 2011/0234750 | A1* | 9/2011 | Lai ......................... G03B 37/04 348/37 |
| 2011/0311104 | A1 | 12/2011 | Sinha et al. |
| 2012/0019614 | A1 | 1/2012 | Murray et al. |
| 2012/0099804 | A1 | 4/2012 | Aguilera et al. |
| 2012/0127169 | A1 | 5/2012 | Barcay et al. |
| 2012/0223936 | A1 | 9/2012 | Aughey et al. |
| 2012/0237111 | A1 | 9/2012 | Sinha et al. |
| 2012/0249957 | A1* | 10/2012 | Shibata ................ A61B 3/0025 351/206 |
| 2012/0274738 | A1 | 11/2012 | Shi et al. |
| 2012/0289826 | A1 | 11/2012 | Graumann et al. |
| 2012/0300020 | A1 | 11/2012 | Arth et al. |
| 2012/0314040 | A1 | 12/2012 | Kopf et al. |
| 2013/0063549 | A1 | 3/2013 | Schnyder et al. |
| 2013/0182066 | A1* | 7/2013 | Ishimoto ................ H04N 7/181 348/38 |
| 2014/0118479 | A1 | 5/2014 | Rapoport |
| 2014/0184585 | A1 | 7/2014 | Under et al. |
| 2014/0184596 | A1 | 7/2014 | Unger et al. |
| 2014/0184631 | A1 | 7/2014 | Unger et al. |
| 2014/0267343 | A1 | 9/2014 | Arcas et al. |
| 2014/0267587 | A1 | 9/2014 | Arcas et al. |
| 2014/0267588 | A1 | 9/2014 | Arcas et al. |
| 2014/0267600 | A1 | 9/2014 | Arcas et al. |

FOREIGN PATENT DOCUMENTS

| | | |
|---|---|---|
| CN | 102187309 | 9/2011 |
| CN | 102918858 A | 2/2013 |

OTHER PUBLICATIONS

"Camera Planning in Virtual Environments Using the Corridor Map Method", Roland Geraerts, 2009, Motion in Games, Lecture Notes in Computer Science, vol. 5884, pp. 194-206.
"Color Transfer between Images", Erik Reinhard, Michael Ashikhmin Bruce Gooch and Peter Shirley, 2001, reprinted from the Internet at: http://www.cs.utah.edu/-shirley/papers/ColorTransfer.pdf, 8 pgs.
"Efficient View-Dependent Image-Based Rendering with Projective Texture-Mapping", Paul Debevec, Yizhou Yu, and George Borshukov, 1998, reprinted from the Internet at: http://www.pauldebevec.com/ResearchNDTM/debevec_vdtm_egrw98.pdf, 13 pgs.
"Euclidean space", From Wikipedia, the free encyclopedia, Modified Jan. 28, 2014, 1 pg.
"GrabCut—Interactive Foreground Extraction using Iterated graph Cuts", Carsten Rother, Vladimir Kolmogorov and Anrew Blake, Aug. 2004, ACM Transactions on Graphics, vol. 23, No. 3, 309-314.
"Image Alignment and Stitching: A Tutorial", Richard Szeliski, Oct. 2004, Internet Citation, reprinted from the Internet at: http://robots.stanford.edu/cs223b05/MSR-TR-2004-92-Jan26.pdf, 71 pgs.
"Interactive Digital Photomontage", Aseem Agarwala, Mira Dontcheva, Maneesh Agrawala, Steven Drucker, Alex Colburn, Brian Curless, David Salesin and Michael Cohen, Aug. 2004, ACM Transactions on Graphics, vol. 3, No. 23, pp. 294-302.
"Interactive Graph Cuts for Optimal Boundary & Region Segmentation of Objects in N-D Images", Yuri Y. Boykov and Marie-Pierre Jolly, Jul. 2001, Proceedings of the Eighth IEEE International conference on Computer Vision, vol. 1, pp. 105-112.
"Introducing the Office (2007) Open XML File Formats", Frank Rice, May 2006, reprinted from the Internet at: http:// msdn.microsoft.com/en-us/library/office/aa338205(v=office.12).aspx, 24 pgs.
"Manifold", From Wikipedia, the free encyclopedia, Modified Jan. 3, 2014, 1 pg.
"Mathematics", From Wikipedia, the free encyclopedia, Modified Jan. 24, 2014, 1 pg.
"Modeling and Rendering Architecture from Photographs: A hybrid geometry- and image-based approach", Paule, Debevec, Camillo J. Taylor and Jitendra Malik, 1996, SIGGRAPH 96 Conference Proceedings, Reprinted from the Internet at: http://www.pauldebevec.com/Research/debevec-siggraph96-paper.pdf, pp. 11-20.
"Mosaics of Scenes with Moving Objects", James Davis, Jun. 1998, Proceedings 1998 IEEE Computer Society Conference on Santa Barvara, Ca. Computer Vision and Pattern Recognition, pp. 354-360.
"Open Packaging Conventions", From Wikipedia, the free encyclopedia, Modified Dec. 27, 2013, 7 pgs.
"Panorama Weaving: Fast and Flexible Seam Processing", Brian Summa, Julien Tierny and Valerio Pascucci, Jul. 2012, ACM Transactions on Graphics, vol. 31, No. 4, pp. 1-11.
"Photo Tourism: Exploring Photo Collections in 3D", Noah Snavely, Steven M. Seitz and Richard Szeliski, Jan. 1, 2006, Siggraph Conference Proceedings, vol. 25, No. 3, pp. 1-11.
"QuckTime(R) VR—An Image-Based Approach to Virtual Environment Navigation", Shenchang Eric Chen, Aug. 6, 1995, Computer Graphics Proceedings, IEEE, pp. 29-38.
"Scene Reconstruction and Visualization from Internet Photo Collections", Keith N. Snavely, 2008, A Dissertation, Submitted in Partial fulfillment of the requirements for the degree of doctor of philosophy University of Washington, reprinted from the Internet at: https://www.cs.cornell.edu/-snavely/publications/thesis/thesis.pdf, 210 pgs.
"Topological space", From Wikipedia, the free encyclopedia, Modified Jan. 14, 2014, 8 pgs.
"View Interpolation for Image Synthesis", Shenchang Eric Chen and Lance Williams, 1993, reprinted from the Internet at: http://cseweb.ucsd.edu/-ravir/6998/papers/p279-chen.pdf, pp. 279-288.
"Withindows: A Framework for Transitional desktop and Immersive User Interfaces", Alex Hill and Andrew Johnson, Mar. 8-9, 2008, Publised in: IEEE Symposium on 3D User Interfaces, 8 pgs.

(56) References Cited

OTHER PUBLICATIONS

Agarwala, Aseem et al., "Panoramic Video textures", ACM Transactions on Graphics (TOG), Jul. 1, 2005, pp. 821-827.
Calibration of Omnidirectional Stereo for Mobile Robots, Yoshi Ro Negishi, Jun Miura and Yoshiaki Shirai, Sep. 28-Oct. 2, 2004, Proceedings of 2004 IEEE/RSJ International Conference on Intelligent Robots and Systems, Sandal, Japan, pp. 2600-2605.
Eun-Young Kang et al: "Scene transition based on image registration for Web-based virtual tour", Article 33(3) PCT, Proceedings of the Ninth Iasted International Conference on Internet and Multimedia Systems and Applications Aug. 15-17, 2005 Honolulu, HI, USA, ACTA Press, Anaheim, Jan. 2005 (Jan. 2005 ), pp. 41-46, Retrieved from the Internet: URL:http://tlaloc.sfsu.edu/~yoon/PUB/IMSA2005.pdf, 6 pgs.
European Communication in Application 14715498.3, dated Nov. 27, 2015, 2 pgs.
European Communication in Application 14719556.4, dated Oct. 21, 2015, 2 pgs.
European Communication in Application 14724823.1, dated Oct. 21, 2015, 2 pgs.
European Communication in Application 14724823.1, dated Feb. 24, 2017, 6 pgs.
European Office Action in Application 14715498.3, dated Sep. 2, 2016. 11 pgs.
Fixing Panorama Alignment in Potoshop C S4, Sean Duggan, Nov. 11, 2009, Layers Magazine, The How-To Magazine for Everything, 12 pgs.
Geometrical Design Concept for Panoramic 3D Video Acquisition, O.Schreer, P. Kauff/P. Eisert, C. Weissig and J.C. Rosenthal, Aug. 27-31, 2012, 2oth European Signal Processing Conference, Bucharest, Romania, pp. 2757-2761.
Image Blending and View Clustering for Multi-Viewer Immersive Projection Environments, Jonathan Marbach, Mar. 14-18, 2009, IEEE Virtual Reality, Lafayette, Louisiana, pp. 51-54.
Learn How to Create Gigapixel Macro Photographs, 2011, Gigamacro, 4 pgs.
Panorama Stitching, Dan Stack, Feb. 27, 2012, reprinted from the Internet at: http://dpbestflow.org/image—editing/panorama-stitching, 20 pgs.
PCT Int. Search Report cited in PCT Application No. PCT/US2014/023888 dated Jul. 24, 2014, 10 pgs.
PCT Int. Search Report cited in PCT Application No. PCT/US2014/023915 dated Jun. 10, 2014, 13 pgs.
PCT Int. Search Report cited in PCT Application No. PCT/US2014/023980 dated Jul. 7, 2014, 13 pgs.
PCT International Preliminary Report on Patentability Issued in PCT Application No. PCT/US2014/023888, Mailed Date: Jun. 17, 2015, 8 Pages.
PCT International Search Report cited in PCT Application No. PCT/US2014/023873 dated Oct. 9, 2014, 23 pgs.
PCT Reply Written Opinion cited in PCT Application No. PCT/US2014/023873 dated Jan. 8, 2015, 5 pgs.
PCT Written Opinion cited in PCT Application No. PCT/US2014/023888 dated Feb. 12, 2015, 10 Pages.
PCT Written Opinion in International Application PCT/US2014/023873, dated Feb. 12, 2015, 15 pgs.
PCT Written Opinion in PCT Application No. PCT/US2014/023915 dated Jan. 5, 2015, 9 pgs.
PCT Written Opinion of the Internal Preliminary Examining Authority in International Application PCT/US2014/023980, dated Apr. 2, 2015, 9 pgs.
Photosynth, Feb. 8, 2013, reprinted from the Internet at: http://photosynth.neI/about.aspx, 2 pgs.
Structure and Pose from Single Images of Symmetric Objects with Applications to Robot Navigation, Allen Y. Yang, Wei Hong and Yi Ma, Sep. 14-19, 2003, Proceedings of the 2003 IEEE International Conference on Robotics and Automatics, pp. 1013-1020.
Swaminathan, Rahul et al, "A perspective on distortions", Proceedings / 2003 IEEE Computer Society Conference on Computer Vision and Pattern Recognition, Jun. 18-20, 2003, Madison, Wisconsin; vol. 2, Jun. 18, 2003, pp. 594-601.
Tips and Tricks from the Pros, Fred Kamphues, Feb. 9, 2013, reprinted from the Internet at: http://www. sandisk.com/consumer/camera-and-camcorder-memory/taking-better-photo-video/panorama-photography/, 2 pgs.
U.S. Appl. No. 13/804,543, Amendment and Response filed Nov. 6, 2015, 11 pgs.
U.S. Appl. No. 13/804,543, Amendment and Response filed Jul. 21, 2015, 15 pgs.
U.S. Appl. No. 13/804,543, Notice of Allowance dated Nov. 27, 2015, 10 pgs.
U.S. Appl. No. 13/804,543, Office Action dated Feb. 10, 2015, 12 pgs.
U.S. Appl. No. 13/804,543, Office Action dated Aug. 6, 2015, 13 pgs.
U.S. Appl. No. 13/804,895, Amendment and Response filed Oct. 10, 2016, 14 pgs.
U.S. Appl. No. 13/804,895, Amendment and Response filed Oct. 15, 2015, 12 pgs.
U.S. Appl. No. 13/804,895, Amendment and Response filed Dec. 23, 2015, 12 pgs.
U.S. Appl. No. 13/804,895, Amendment and Response filed May 10, 2017, 13 pgs.
U.S. Appl. No. 13/804,895, Amendment and Response filed May 26, 2016, 15 pgs.
U.S. Appl. No. 13/804,895, Amendment and Response filed Jul. 27, 2015, 16 pgs.
U.S. Appl. No. 13/804,895, Office Action dated Feb. 13, 2017, 29 pgs.
U.S. Appl. No. 13/804,895, Office Action dated Feb. 25, 2015, 18 pgs.
U.S. Appl. No. 13/804,895, Office Action dated Feb. 26, 2016, 26 pgs.
U.S. Appl. No. 13/804,895, Office Action dated Aug. 11, 2016, 30 pgs.
U.S. Appl. No. 13/804,895, Office Action dated Aug. 13, 2015, 20 pgs.
U.S. Appl. No. 13/826,091, Amendment and Response filed Dec. 7, 2015, 14 pgs.
U.S. Appl. No. 13/826,091, Amendment and Response filed Dec. 8, 2016, 13 pgs.
U.S. Appl. No. 13/826,091, Amendment and Response filed Apr. 14, 2016, 15 pgs.
U.S. Appl. No. 13/826,091, Notice of Allowance dated Feb. 10, 2017, 8 pgs.
U.S. Appl. No. 13/826,091, Office Action dated Jan. 14, 2016, 26 pgs.
U.S. Appl. No. 13/826,091, Office Action dated Aug. 5, 2015, 22 pgs.
U.S. Appl. No. 13/826,091, Office Action dated Sep. 9, 2016, 20 pgs.
U.S. Appl. No. 13/826,423, Amendment and Response filed Dec. 22, 2015, 13 pgs.
U.S. Appl. No. 13/826,423, Amendment and Response filed Jun. 2, 2016, 15 pgs.
U.S. Appl. No. 13/826,423, Amendment and Response filed Jul. 23, 2015, 12 pgs.
U.S. Appl. No. 13/826,423, Office Action dated Feb. 2, 2016, 19 pgs.
U.S. Appl. No. 13/826,423, Office Action dated Apr. 23, 2015, 17 pgs.
U.S. Appl. No. 13/826,423, Office Action dated Aug. 2, 2016, 23 pgs.
U.S. Appl. No. 13/826,423, Office Action dated Sep. 23, 2015, 20 pgs.
Uyttendaele, Matthew at al., "Eliminating ghosting and exposure artifacts in image mosaics", Proceedings 2001 IEEE Conference on Computer Vision and Pattern Recognition, CVPR 2001, Kauai, Hawaii, vol. 2, Dec. 8, 2001, pp. 509-516.

(56) References Cited

OTHER PUBLICATIONS

Virtual Navigation of Complex Scenes using Clusters of Cylindrical Panoramic Images, Sing Bing Kang and Pavan K. Desikan, Sep. 1997, Digital, Cambridge Research Laboratory, Technical Report Series, 30 pgs.
Virtual Video Camera: Image-Based Viewpoint Navigation Through Space and Time, C. Lipski, C. Linz, K. Berger, A. Sellent and M. Magnor, 2010, Computer Graphics Forum, vol. 0, No. 0, 12 pgs.
Chinese 1st Office Action in Application 201480014983.2, dated Mar. 22, 2017, 13 pgs.
Shenchang, Eric Chen, "QuickTime VR—An Image-Based Approach to Virtual Environment Navigation", Proceedings of the 22nd annual conference on Computer graphics and interactive techniques, Aug. 11, 1995, pp. 30-36.
Zhang Xiaodong, "Research and Implementation of an Interactive Panoramic System Based on a Static Image", Full Text Database of China Excellent Master Degree Thesis (with English abstract), Information Technology Series, Dec. 15, 2012, 45 pgs.
"Notice of Allowance Issued in U.S. Appl. No. 13/826,091", dated Jun. 20, 2017, 2 Pages.
"International Preliminary Report on Patentability Issued in PCT Application No. PCT/US2014/023915", dated May 15, 2015, 12 Pages.
U.S. Appl. No. 13/804,895, Office Action dated Aug. 25, 2017, 24 pgs.
Office Action Issued in European Patent Application No. 14715498.3, dated Oct. 23, 2017, 7 Pages.
"First Office Action and Search Report Issued in Chinese Patent Application No. 201480015275.0", dated Feb. 2, 2018, 15 Pages.

\* cited by examiner

IMAGE CAPTURE AND ORDERING

CROSS-REFERENCE TO RELATED APPLICATIONS

This application is a continuation application of U.S. patent application Ser. No. 13/826,091, entitled "IMAGE CAPTURE AND ORDERING," filed on Mar. 14, 2013, now U.S. Pat. No. 9,712,746, granted Jul. 18, 2017, the entire disclosure of which is hereby incorporated herein by reference.

BACKGROUND

Many users may create image data using various devices, such as digital cameras, tablets, mobile devices, smart phones, etc. For example, a user may capture an image of a beach using a mobile phone while on vacation. The user may upload the image to an image sharing website, and may share the image with other users. In an example of image data, one or more images may be stitched together to create a panorama of a scene depicted by the one or more images. If the one or more images are stitched together in an arbitrary order, then the panorama may comprise seam lines (e.g., resulting from an object moving within the scene during image capture, and thus being in different locations in different images) or other undesirable effects. If the one or more images were captured from viewpoints having unaligned focal points, then parallax errors may result in the panorama, for example.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for ordering images for panorama stitching and/or for providing a focal point indicator for image capture are provided herein.

In some embodiments of ordering images for panorama stitching, an image stack, comprising one or more images that may be stitched together to generate a panorama, is maintained. For example, a user may have captured eight images depicting a renovated basement from various viewpoints. The eight images and/or subsequently captured images of the renovated basement may be maintained according to a particular ordering within the image stack, and may be used for generating a panorama of the renovated basement. The image stack may be segmented into one or more regions. In an example, a region may correspond to a single position within the image stack (e.g., a first region corresponds to a top position of the image stack, a second region corresponds to a bottom position of the image stack, and one or more additional regions correspond to positions between the top position and the bottom position). In another example, a region may correspond to multiple positions within the image stack (e.g., a first region corresponds to a first half of the image stack (e.g., top four images) and a second region corresponds to a second half of the image stack (e.g., bottom four images)).

A first ordering preference may be associated with a first region of the image stack (e.g., a top position of the image stack); a second ordering preference may be associated with a second region of the image stack (e.g., a non-top position of the image stack); and/or other ordering preferences may be associated with other regions of the image stack. In an example of adding a current image to the image stack, the first ordering preference corresponds to manually captured image criteria and the second ordering preference corresponds to automatically captured image criteria. If a current image is a manually captured image (e.g., a user manually captures a new image of the renovated basement), then the current image is added to the first region of the image stack (e.g., the top position of the image stack) based upon the first ordering preference. If the current image is an automatically captured image (e.g., a camera automatically captures the image of the renovated basement), then the current image is added to the second region of the image stack (e.g., a non-top position of the image stack) based upon the second ordering preference. It may be appreciated that the first ordering preference, the second ordering preference, and/or other ordering preference may correspond to other types of preferences, such as temporal criteria (e.g., recently captured images are added to the first region, while previously captured images are added to the second region). In this way, the image stack may be maintained by ordering images within the image stack.

During generation of the panorama, the one or more images within the image stack may be stitched according to a stitching order. In an example, the stitching order specifies that the first region has a stitching priority relative to the second region. The stitching order may, for example, associate the first region with a foreground bias and the second region with a background bias. For example, images having a relatively higher priority, such as relatively newer images or manually captured images, may be used to stitch the foreground, while images having a relatively lower priority, such as relatively older images or automatically captured images, may be used to stitch the background. It will be appreciated, however, that a foreground bias and/or a background bias does not necessarily imply a hard ordering towards foreground and/or background. Rather, a foreground bias may, for example, imply an increased probability that an image will be visible (e.g., in the foreground or elsewhere), and a background bias may, for example, imply a decreased probability that an image will be visible (e.g., in the background or elsewhere). It may be appreciated that the stitching order may correspond to other ordering priorities or portions of the panorama.

In some embodiments of providing a focal point indictor for image capture, a current position of a camera may be tracked (e.g., a standalone camera, a camera associated with a computing device, etc.). For example, positional data and/or orientation data of the camera may be tracked in real-time while the camera is used to capture one or more images depicting a scene (e.g., one or more images of a renovated basement). The one or more images may be used to generate a visualization of the scene, such as a spin movie, a panorama, a non-panorama visualization, etc. A focal point indicator may be provided through the camera to aid a user in capturing a current image of the scene (e.g., a current image depicting a portion of the renovated basement not already depicted by one or more previously capture images; a current image captured from a focal point of the scene; etc.). For example, the current position of the camera may be compared with a focal point of the scene depicted by one or more previously captured images. Based upon the comparison, a focal point indicator may be generated. The focal point indicator may be provided during capture of a current image of the scene. For example, a visual indicator (e.g., an on/off spot indicator, a target icon, etc.) may be displayed through the camera to indicate a viewpoint (e.g., associated with a camera position/orientation) from which the user may capture the current image. In this way, the user may be aided in capturing one or more images used to create a visualization of the scene (e.g., so that a current image is captured from a focal point corresponding to a focal point of one or more previously captured images).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
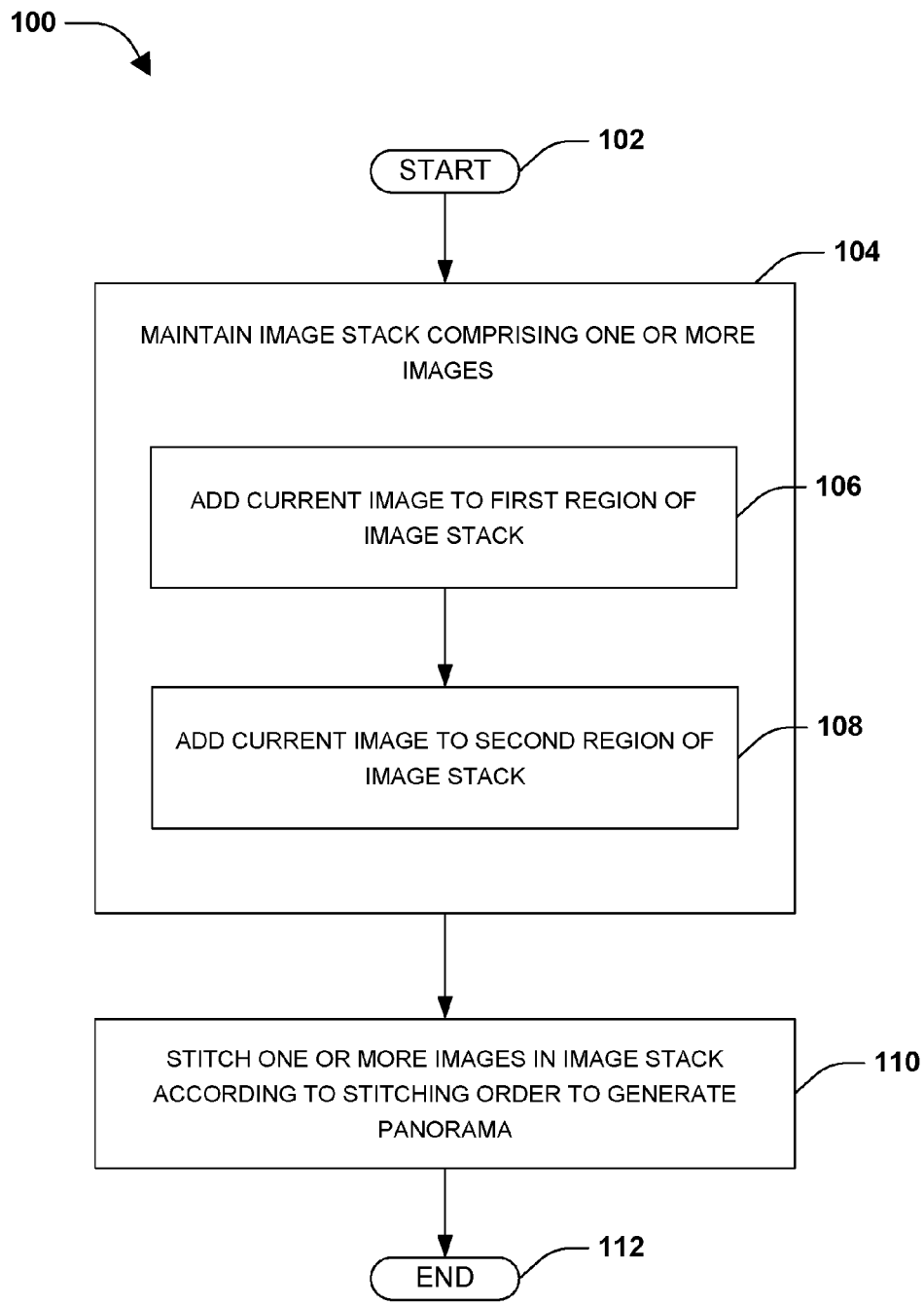
FIG. 1 is a flow diagram illustrating an exemplary method of ordering images for panorama stitching.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of ordering images for panorama stitching is illustrated by an exemplary method 100 of FIG. 1. At 102, the method starts. At 104, an image stack, comprising one or more images that may be stitched together to generate a panorama, is maintained (e.g., image stack 210 of FIG. 2). For example, the one or more images may depict a scene of a kitchen renovation project from various viewpoints. The one or more images may be stitched together to create a panorama depicting the kitchen renovation project (e.g., a user may visually explore the kitchen renovation project based upon multidimensional navigation in the panorama). An ordering of the one or more images and/or subsequently captured images may be maintained within the image stack. In this way, images within the image stack may be efficiently stitched together according to a stitching order to generate the panorama (e.g., relatively more significant images may be used to represent relatively prominent features of the panorama, such as in a foreground of the panorama).

In an example, a current image may be added to the image stack based upon one or more ordering preferences. At 106, responsive to the current image corresponding to a first ordering preference, the current image is added to a first region of the image stack. In an example where the first ordering preference corresponds to a later in time criteria, the current image is added to a top position of the image stack based upon the current image having a relatively newer timestamp (e.g., example 300 of FIG. 3). In another example where the first ordering preference corresponds to a manually captured image criteria, the current image is added to a first half of the image stack based upon the current image having been manually captured by a user (e.g., example 400 of FIG. 4). At 108, responsive to the current image corresponding to a second ordering preference, the current image is added to a second region of the image stack. In an example where the second ordering preference corresponds to an earlier in time criteria, the current image is added to a bottom position of the image stack based upon the current image having a relatively older timestamp (e.g., example 300 of FIG. 3). In another example where the second ordering preference corresponds to an automatically captured image, the current image is added to a second half of the image stack based upon the current image having been automatically captured by a camera device (e.g., example 400 of FIG. 4). It may be appreciated that other ordering preferences may be specified and/or other regions may be designated for the image stack.

In an example, one or more images within the image stack may be reordered based upon input modifying a position of an image within the image stack. For example, a user may have captured an image depicting a relatively significant portion of the kitchen renovation project (e.g., an image depicting a new kitchen island). However, the image may have a relatively low stitching priority based upon the image corresponding to an ordering preference that placed the image into a region of the image stack having a relatively lower stitching priority (e.g., the image may have been automatically captured). Thus, the user may indicate that the image is to be moved into a region having a relatively higher stitching priority (e.g., the user may assign a relatively high rating to the image; the user may drag and drop the image within an image stack user interface; the user may designate the image as significant to the user; etc.). Accordingly, the image may be repositioned within the image stack. In an example, repositioning the image may result in another image being reassigned from a region to another region (e.g., a first image may be reassigned from the first region to the second region; a second image may be reassigned from the second region to the first region or to a third region; etc.).

At 110, the one or more images in the image stack are stitched according to a stitching order to generate the panorama. The stitching order may specify that the first region has a stitching priority relative to the second region.

In an example, one or more images within the first region may be stitched before one or more images within the second region. In another example, one or more images within the first region are used to stitch together a foreground of the panorama, while one or more images within the second region are used to stitch together a background of the panorama. In this way, the panorama may be generated by stitching one or more images from the image stack according to the stitching order. At 112, the method ends.

Figure 2:
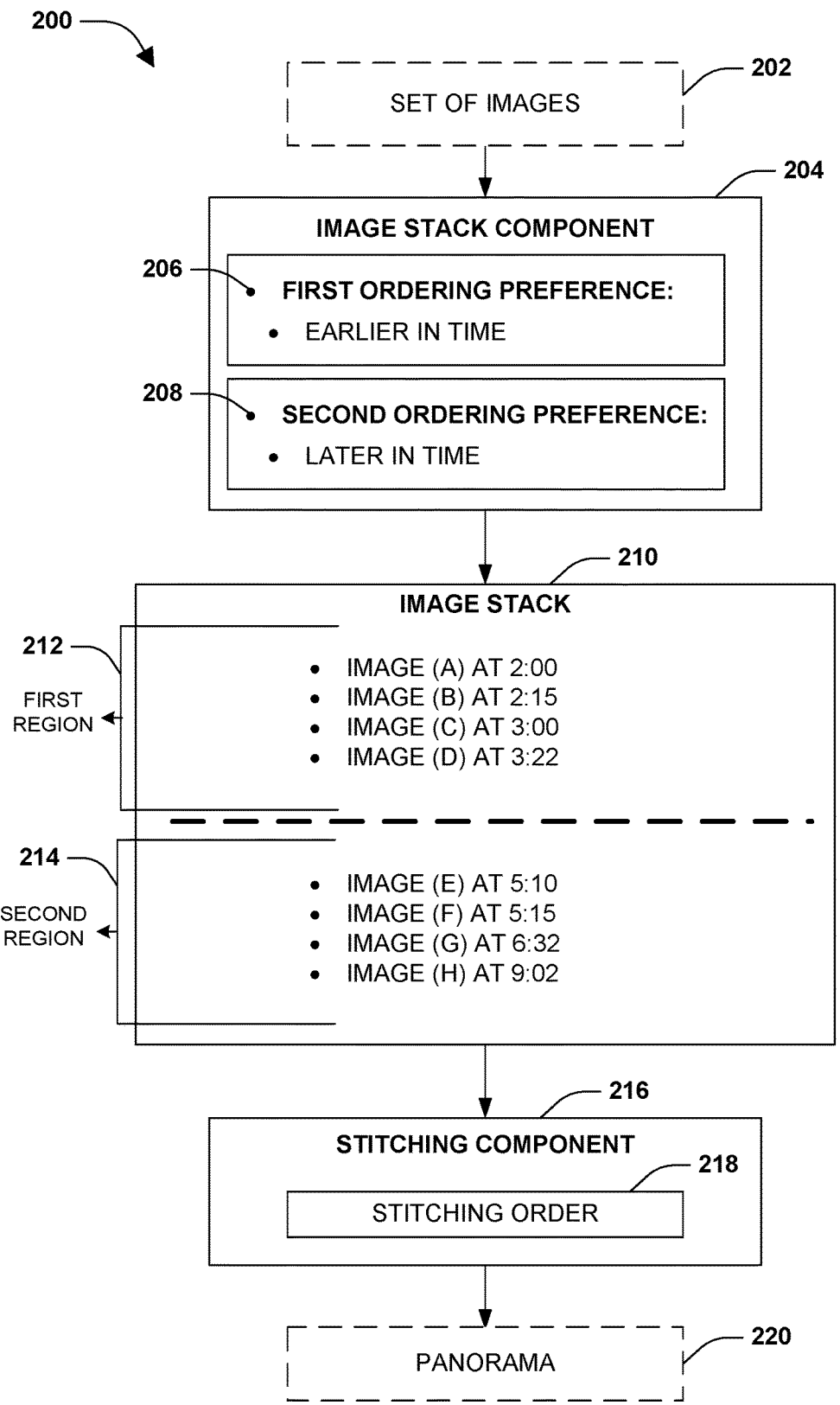
FIG. 2 is a component block diagram illustrating an exemplary system for ordering images for panorama stitching.

FIG. 2 illustrates an example of a system 200 configured for ordering images for panorama stitching. The system 200 comprises an image stack component 204 and/or a stitching component 216. The image stack component 204 is configured to maintain an image stack 210 comprising one or more images that may be stitched together by the stitching component 216 to generate a panorama 220 of a scene depicted by the one or more images. For example, the image stack component 204 is configured to store a set of images 202 within the image stack 210 based upon one or more ordering preferences, such as a first ordering preference 206, a second ordering preference 208, and/or other ordering preferences not illustrated. In an example, the first ordering preference 206 corresponds to an earlier in time criteria, such that one or more current images having relatively older timestamps may be added into a first region 212, having a relatively higher stitching priority, of the image stack 210 (e.g., image (A), image (B), image (C), and image (D) have relatively older timestamps compared with image (E), image (F), image (G), and image (H)). The second ordering preference 208 corresponds to a later in time criteria, such that one or more current images having relatively newer timestamps may be added into a second region 214, having a relatively lower stitching priority, of the image stack 210 (e.g., image (E), image (F), image (G), and image (H) have relatively newer timestamps compared with image (A), image (B), image (C), and image (D)). In this way, the set of images 202 may be stored within one or more regions of the image stack 210 based upon the one or more ordering preferences.

It will be appreciated that, as provided herein, more than just two regions (or merely a single region) may be comprised within an image stack and/or that differing numbers of images may be comprised within different regions, such as a first number of images in a first region and a second different number of images in a second region. Various ordering preferences may exist, where an ordering preference may pertain to one or more regions and/or one or more images in an image stack. Ordering preferences maybe weighted, given priority relative to one another, etc. such that a location of an image in the image stack may be a function of multiple ordering preferences, for example. A manually captured image may be placed in a first, top, prioritized, etc. region relative to a second non-manually captured image, for example, even if the non-manually captured image was captured more recently than the manually captured image, for example.

The stitching component 216 is configured to stitch one or more images within the image stack 210 according to a stitching order 218 to generate the panorama 220. In an example, the stitching order 218 may specify that images within the first region 212 are to be stitched before images within the second region 214. In another example, the stitching order 218 may specify that images within the first region 212 are to be stitched for relatively prominent features of the panorama 220 (e.g., foreground bias), and that images within the second region 214 are to be stitched for relatively less prominent features of the panorama 220 (e.g., background bias). In this way, the panorama 220 may be generated by stitching one or more images within the image stack 210 based upon the stitching order 218.

Figure 3:
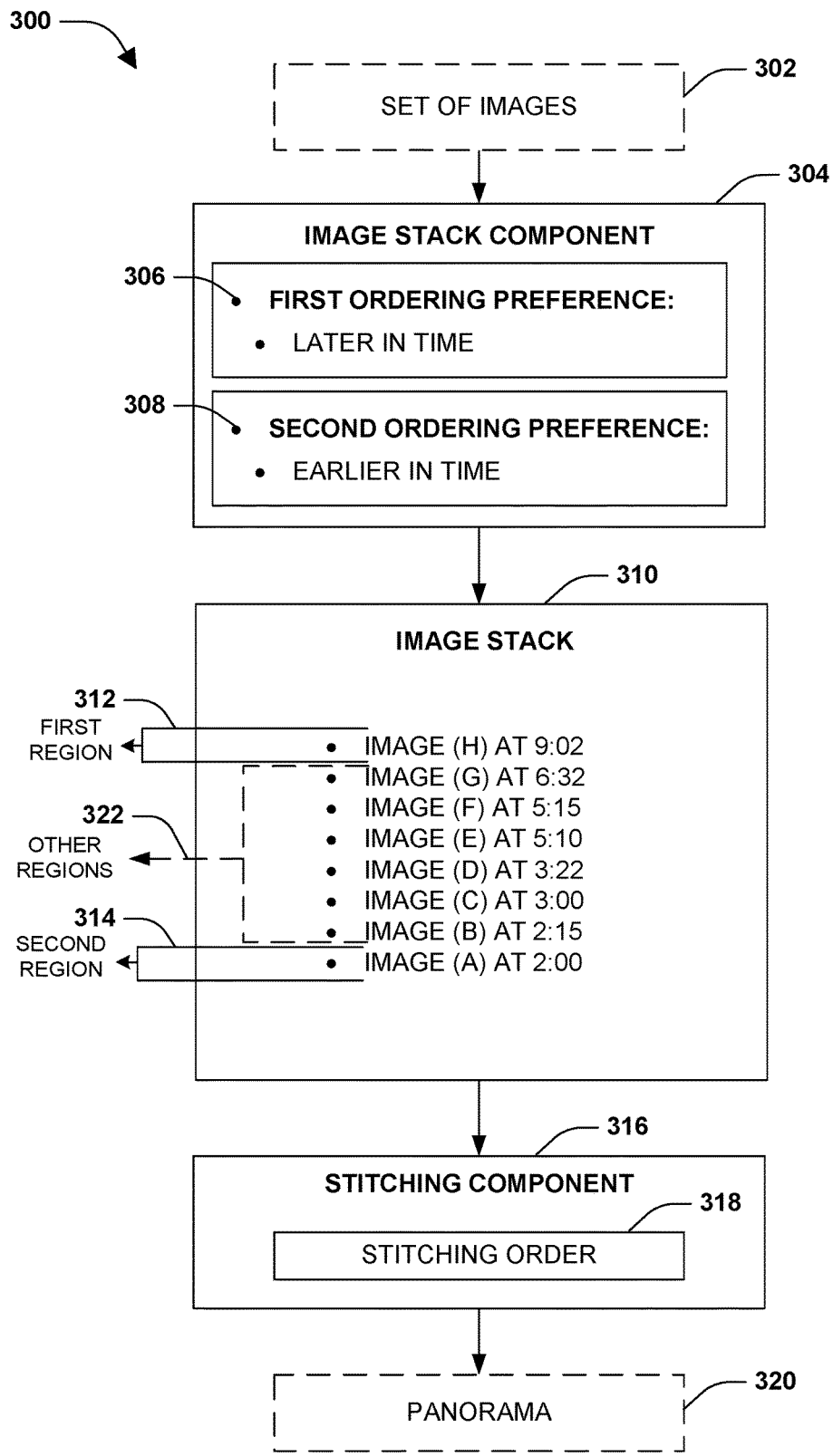
FIG. 3 is a component block diagram illustrating an exemplary system for ordering images for panorama stitching.

FIG. 3 illustrates an example of a system 300 configured for ordering images for panorama stitching. The system 300 comprises an image stack component 304 and/or a stitching component 316. The image stack component 304 is configured to maintain an image stack 310 comprising one or more images that may be stitched together by the stitching component 316 to generate a panorama 320 of a scene depicted by the one or more images. For example, the image stack component 304 is configured to store a set of images 302 within the image stack 310 based upon one or more ordering preferences, such as a first ordering preference 306, a second ordering preference 308, and/or other ordering preferences not illustrated. In an example, the first ordering preference 306 corresponds to a later in time criteria, such that a current image having a relatively newer timestamp may be added into a first region 312, having a relatively higher stitching priority, of the image stack 310 (e.g., image (H) has a relatively recent timestamp compared with other images within the image stack 310). The second ordering preference 308 corresponds to an earlier in time criteria, such that a current image having relatively older timestamp may be added into a second region 314, having a relatively lower stitching priority, of the image stack 310 (e.g., image (A) has a relatively older timestamp compared with other images within the image stack 310). In this way, the set of images 302 may be stored within one or more regions of the image stack 310, such as other regions 322, based upon the one or more ordering preferences.

The stitching component 316 is configured to stitch one or more images within the image stack 310 according to a stitching order 318 to generate the panorama 320. In an example, the stitching order 318 may specify that images within the first region 312 are to be stitched first, images within other regions 322 are to be stitched after images within the first region 312, and images within the second region 314 are to be stitched after images within the other regions 322. In another example, the stitching order 318 may specify that images within the first region 312 are to be stitched for relatively prominent features of the panorama 320 (e.g., foreground bias), images within the second region 314 are to be stitched for relatively less prominent features of the panorama (e.g., background bias), and that images within the other regions 322 can be stitch for any features of the panorama 320. In this way, the panorama 320 may be generated based upon stitching one or more images within the image stack 310 based upon the stitching order 318.

Figure 4:
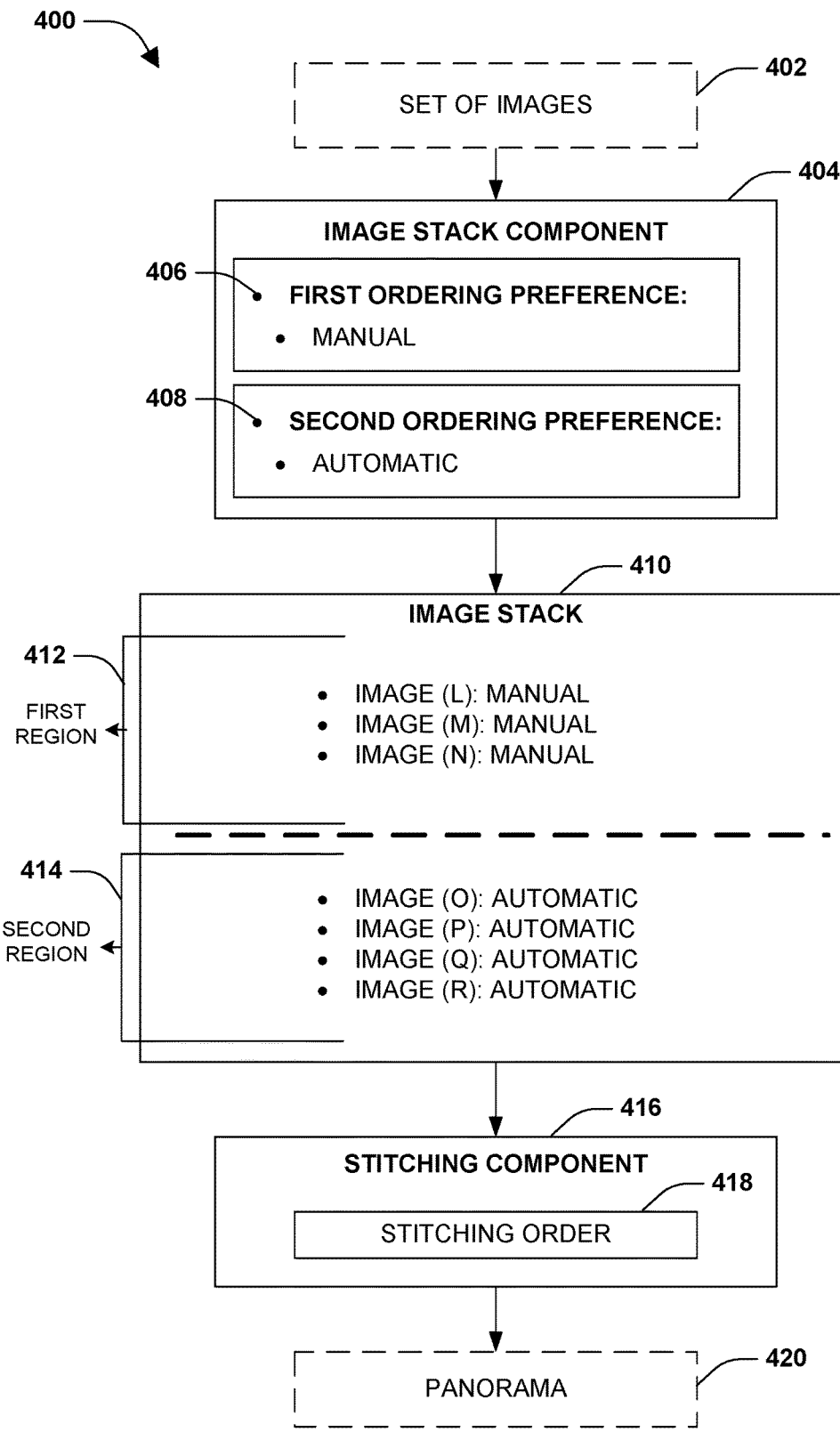
FIG. 4 is a component block diagram illustrating an exemplary system for ordering images for panorama stitching.

FIG. 4 illustrates an example of a system 400 configured for ordering images for panorama stitching. The system 400 comprises an image stack component 404 and/or a stitching component 416. The image stack component 404 is configured to maintain an image stack 410 comprising one or more images that are to be stitched together by the stitching component 416 to generate a panorama of a scene depicted by the one or more images. For example, the image stack component 404 is configured to store a set of images 402 within the image stack 410 based upon one or more ordering preferences, such as a first ordering preference 406, a second ordering preference 408, and/or other ordering preferences not illustrated. In an example, the first ordering preference 406 corresponds to a manually captured image criteria, such that one or more current images that are manually captured may be added into a first region 412, having a relatively higher stitching priority, of the image stack 410 (e.g., image (L), image (M), and image (N) may have been manually captured by a user). The second ordering preference 408 corresponds to an automatically captured image criteria, such that one or more current images that are automatically captured may be added into a second region 414, having a relatively lower stitching priority, of the image stack 410 (e.g., image (O), image (P), image (Q), and image (R) may have been automatically captured by a camera). In this way, the set of images 402 may be stored within one or more regions of the image stack 410 based upon the one or more ordering preferences.

The stitching component 416 is configured to stitch one or more images within the image stack 410 according to a stitching order 418 to generate the panorama 420. In an example, the stitching order 418 may specify that images within the first region 412 are to be stitched before images within the second region 414. In another example, the stitching order 418 may specify that images within the first region 412 are to be stitched for relatively prominent features of the panorama 420 (e.g., foreground bias), and that images within the second region 414 are to be stitched for relatively less prominent features of the panorama 420 (e.g., background bias). In this way, the panorama 420 may be generated based upon stitching one or more images within the image stack 410 based upon the stitching order 418.

Figure 5:
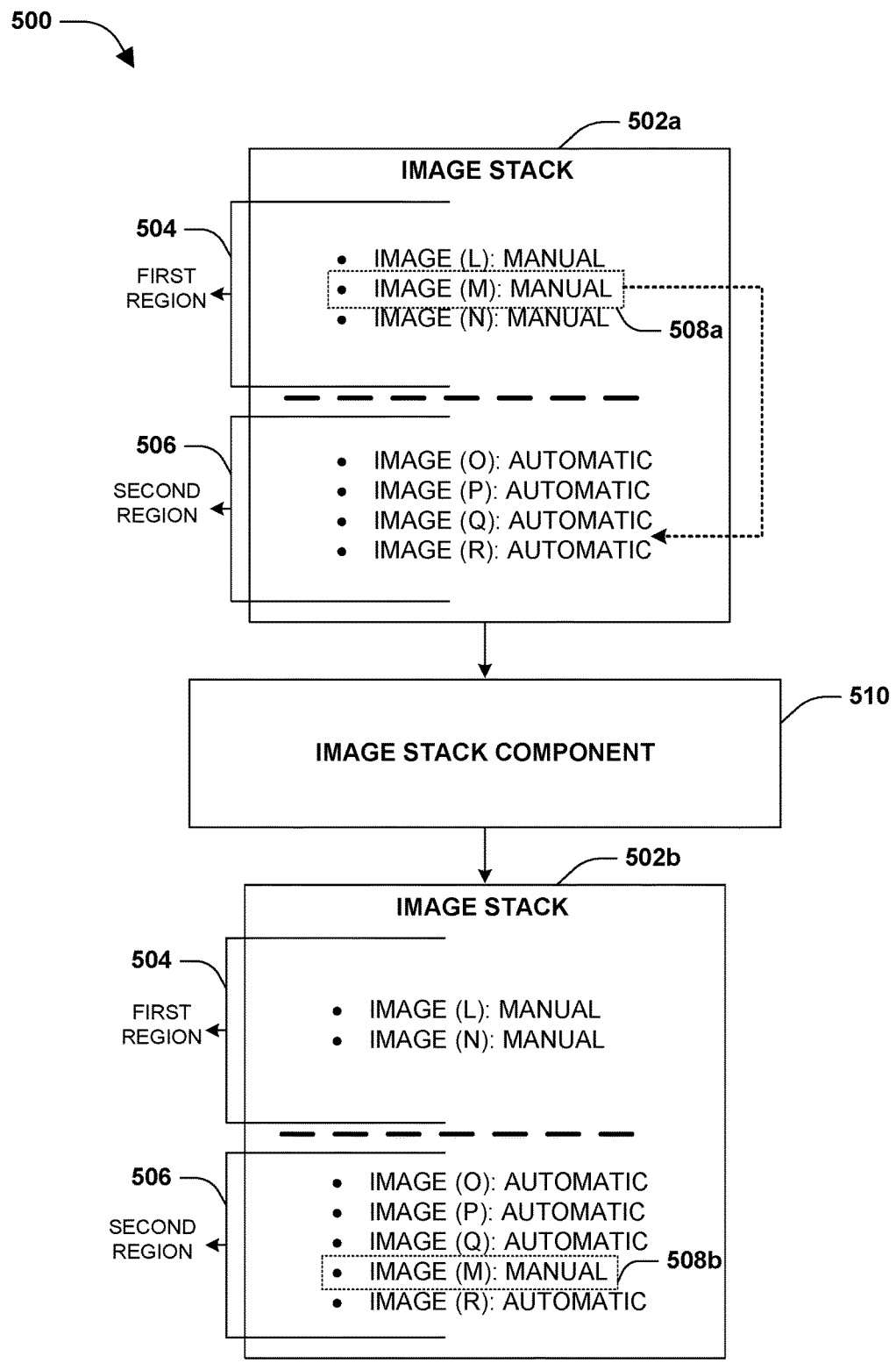
FIG. 5 is a component block diagram illustrating an exemplary system for reordering images within an image stack for panorama stitching.

FIG. 5 illustrates an example of a system 500 configured for reordering images within an image stack for panorama stitching. The system 500 may comprise an image stack component 510. The image stack component 510 may be configured to maintain an image stack (e.g., image stack 502a before reordering and/or image stack 502b after reordering) comprising one or more images that may be stitched according to a stitching order to generate a panorama. The image stack may comprise a first region 504 and a second region 506. The one or more images within the first region 504 may have a relatively higher stitching priority than one or more images within the second region 506. The image stack component 510 may be configured to maintain an order of images within the image stack. For example, the image stack component 510 may store image (L), image (M), and image (N) within the first region 504 of the image stack 502a based upon such images being manually captured. The image stack component 510 may store image (O), image (P), image (Q), and image (R) within the second region 506 of the image stack 502a based upon such image being automatically captured.

The image stack component 510 may be configured to reorder one or more images within the image stack 502a based upon input indicating that a position of an image within the image stack 502 is to be modified, resulting in the image stack 502b. For example, a user may indicate that image (M) is a relatively insignificant image that was manually taken by the user. The indication may be interpreted as input indicating that a position of image (M) 508a within the image stack 502a is to be modified. Responsive to the input, the image stack component 510 may reassign the image (M) 508a from the first region 504 to the second region 506 as image (M) 508b of image stack 502b because the second region 506 has a relatively lower stitching priority than the first region 504. In this way, image (M) 508b may be reassigned to the second region 506 of the image stack 502b. It may be appreciated that image stack 502a and image stack 502b are the same image stack, but depict the time stack before and after the repositioning of image (M).

Figure 6:
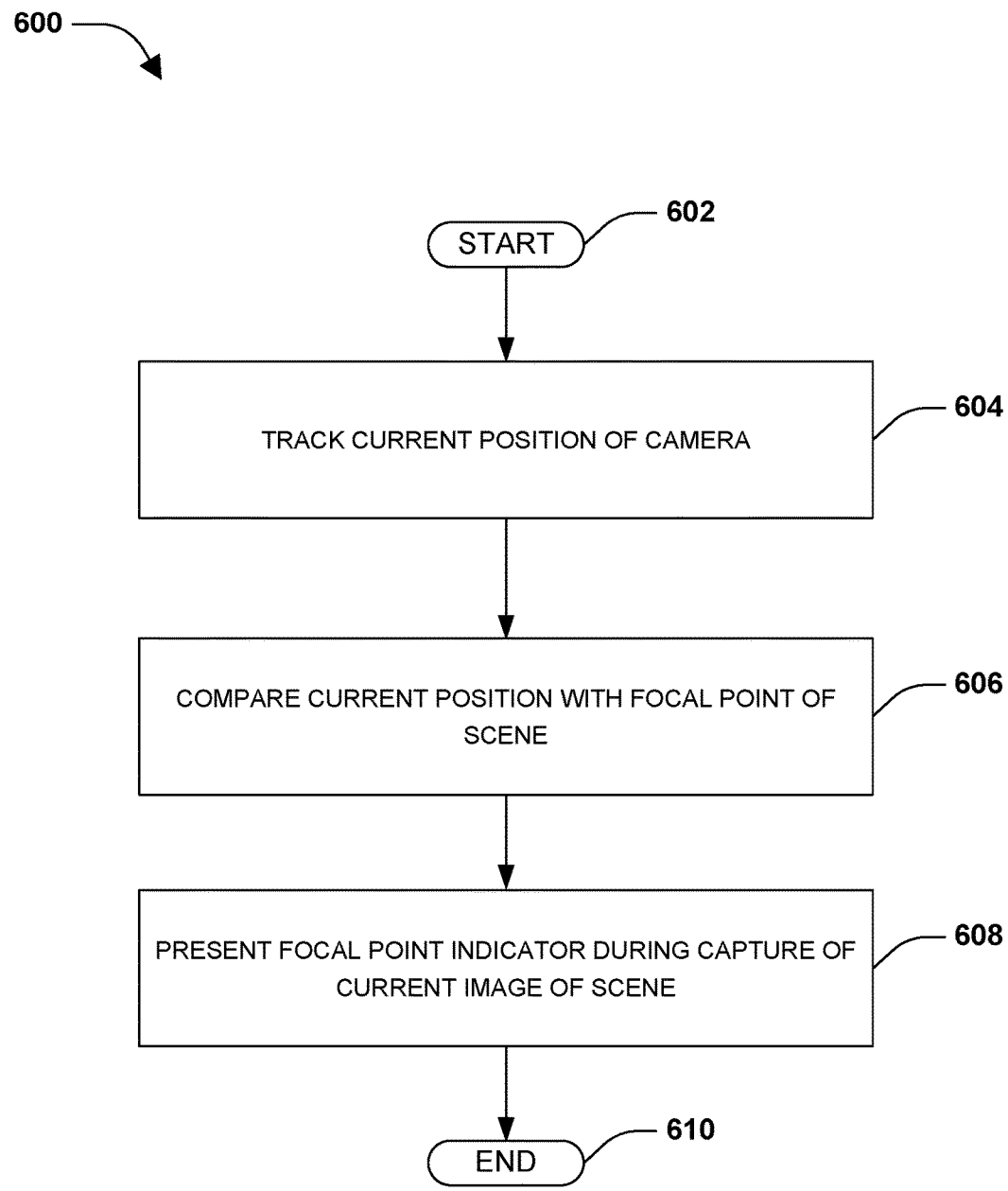
FIG. 6 is a flow diagram illustrating an exemplary method of providing a focal point indicator for image capture.

An embodiment of providing a focal point indicator for image capture is illustrated by an exemplary method 600 of FIG. 6. In an example, a camera may be used to capture one or more images of a scene (e.g., images depicting a renovated kitchen), which may be used to generate a visualization of the scene (e.g., a spin movie, a panorama, a non-panorama visualization, and/or other visualizations). Because more than one image may be used to generate the visualization, guidance may be provided for image capture (e.g., an indicator may be provided to a user, which may indicate a viewpoint from which a next image may be captured so that the scene is adequately represented or "seen" by images used to generate the visualization of the scene, otherwise the visualization may be incomplete because of missing image information). At 602, the method starts. At 604, a current position of a camera is tracked (e.g., a standalone camera or a camera integrated into another computing device, such as a tablet or mobile device). For example, positional data and/or orientation data of the camera are tracked to determine the current position (e.g., data derived from one or more previously captured images; data derived from GPS, data derived from a gyroscope or other positional tracking device; etc.).

At 606, the current position may be compared with a focal point of the scene, derived from one or more previously captured images, to generate a focal point indicator. The focal point of the scene may be derived from respective focal points of the one or more previously captured images of the scene. If the current position of the camera indicates that the camera is viewing the scene from a viewpoint that corresponds to the focal point of the scene, then the focal point indicator may indicate that the camera is in a correct position for capture of a current image. However, if the current position of the camera indicates that the camera is not viewing the scene from a viewpoint that corresponds to the focal point of the scene, then the focal point indicator may indicate that the camera is to be repositioned to a new viewpoint that corresponds to the focal point of the scene so that a current image may be captured from the new viewpoint.

At 608, the focal point indicator may be provided during capture of a current image of the scene. In an example, responsive to the current position corresponding to the focal point, the focal point indicator is not displayed through the camera because the camera is in a correct position. In another example, responsive to the current position corresponding to the focal point, the focal point indicator is displayed through the camera to indicate to a user that the camera is in a correct position. In another example, responsive to the current position not corresponding to the focal point, the focal point indicator is displayed to indicate that the camera is to be moved from the current position to a new position corresponding to the focal point (e.g., an on/off spot indicator may be displayed; a hot/cold indicator may be displayed; a focal point adjustment suggestion such as an arrow indicating a direction with which to move the camera may be displayed; and/or a plethora of other indicators may be provided to aid the user in repositioning the camera). In this way, the current image and the one or more previously captured images may be stitched based upon the focal point of the scene to generate a visualization of the scene. In some embodiments, the user may desire to stop capturing images for the visualization, and start capturing images for a new visualization. A panorama transition indictor may be provided to aid the user in repositioning the camera in order to transition into capturing images for the new visualization. The panorama transition indicator may indicate suggested camera movement to initiate image capture for the new visualization. At 610, the method ends.

Figure 7:
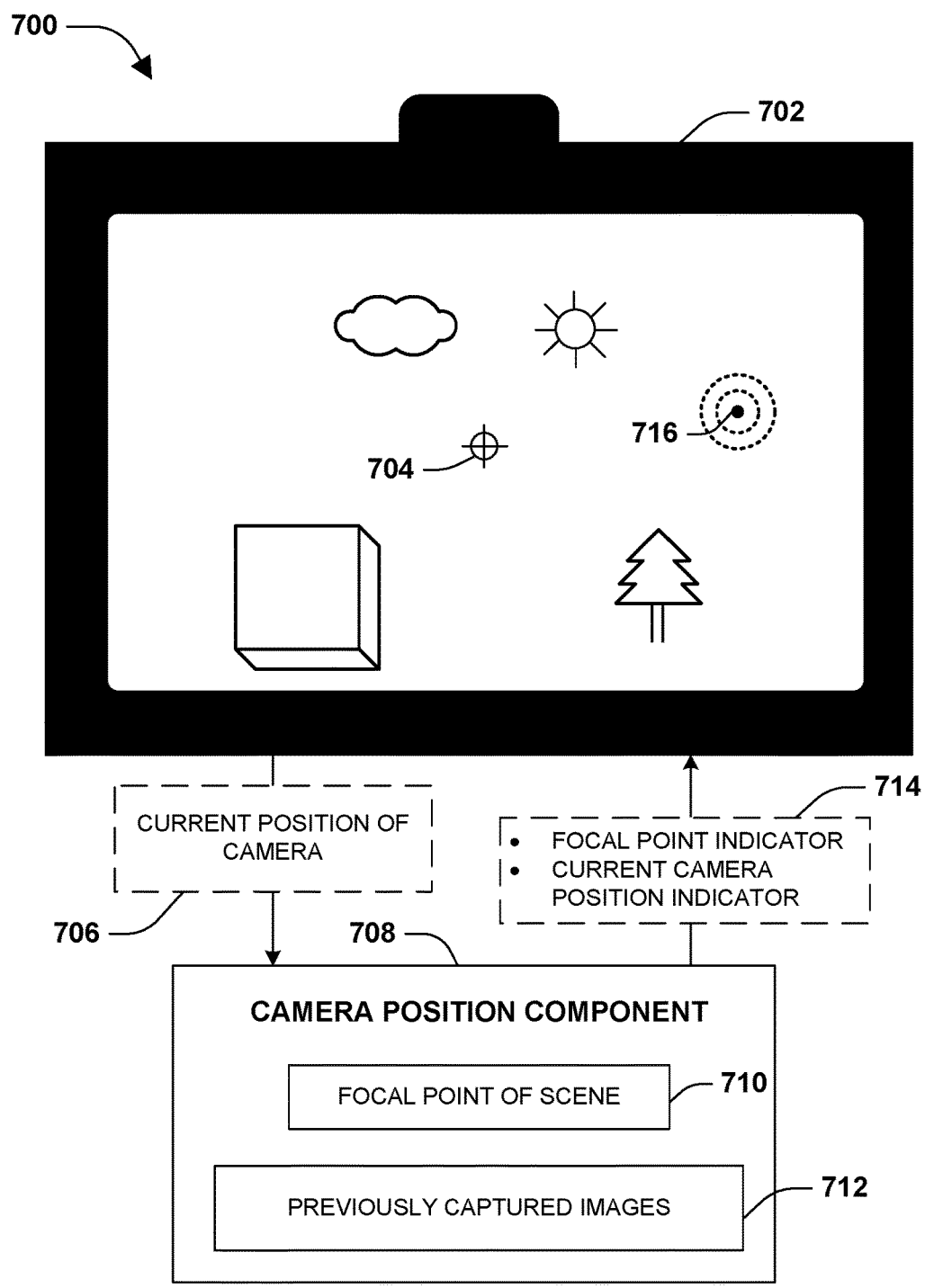
FIG. 7 is a component block diagram illustrating an exemplary system for providing a focal point indicator for image capture.

FIG. 7 illustrates an example of a system 700 configured for providing a focal point indicator 716 for image capture.

The system 700 may be associated with a camera 702 used to capture one or more images depicting a scene (e.g., an outdoor space comprising a tree, a sun, a cloud, a building, etc.). The system 700 may comprise a camera position component 708. The camera position component 708 may have access to one or more previously captured images 712 of the scene (e.g., a first previously captured image depicting the scene from a northern facing viewpoint, a second previously captured image depicting the scene from a southeastern facing viewpoint, a third previously captured image depicting a ground view of the scene, a fourth previously captured image depicting a sky view of the scene, etc.).

In an example, the one or more previously captured images 712 may not depict the scene from a western facing viewpoint, and thus a user may attempt to capture a current image of the scene from the western facing viewpoint using the camera 702. The camera position component 708 may guide the user in capturing the current image so that the current image is captured from a focal point corresponding to a focal point of the scene 710 derived from focal points of the one or more previously captured image 712. In particular, the camera position component 708 tracks a current position 706 of the camera 702. The camera position component 708 may compare the current position 706 with the focal point of the scene 710 to generate the focal point indicator 716. The camera position component 708 may be configured to provide 714 the focal point indicator 716 and/or a current camera position indicator 704, which may aid the user in repositioning the camera 702 so that a current position of the camera 702 corresponds to the focal point of the scene 710 (e.g., such that the current camera position indicator 704 is aligned with the focal point indicator 716). In an example, the focal point indicator 716 may be modified (e.g., increased in size, reduced in size, displayed, hidden, etc.) based upon repositioning of the camera 702 (e.g., the focal point indicator 716 may be increased (or decreased) in size as a current position of the camera has an increased correspondence to the focal point of the scene 710; the focal point indicator 716 may be decreased (or increased) in size as a current position of the camera 702 has a decreased correspondence to the focal point of the scene 710; the focal point indicator 716 may be hidden when a current position of the camera 702 corresponds to the focal point of the scene 710 within a threshold correspondence; etc.).

Figure 8:
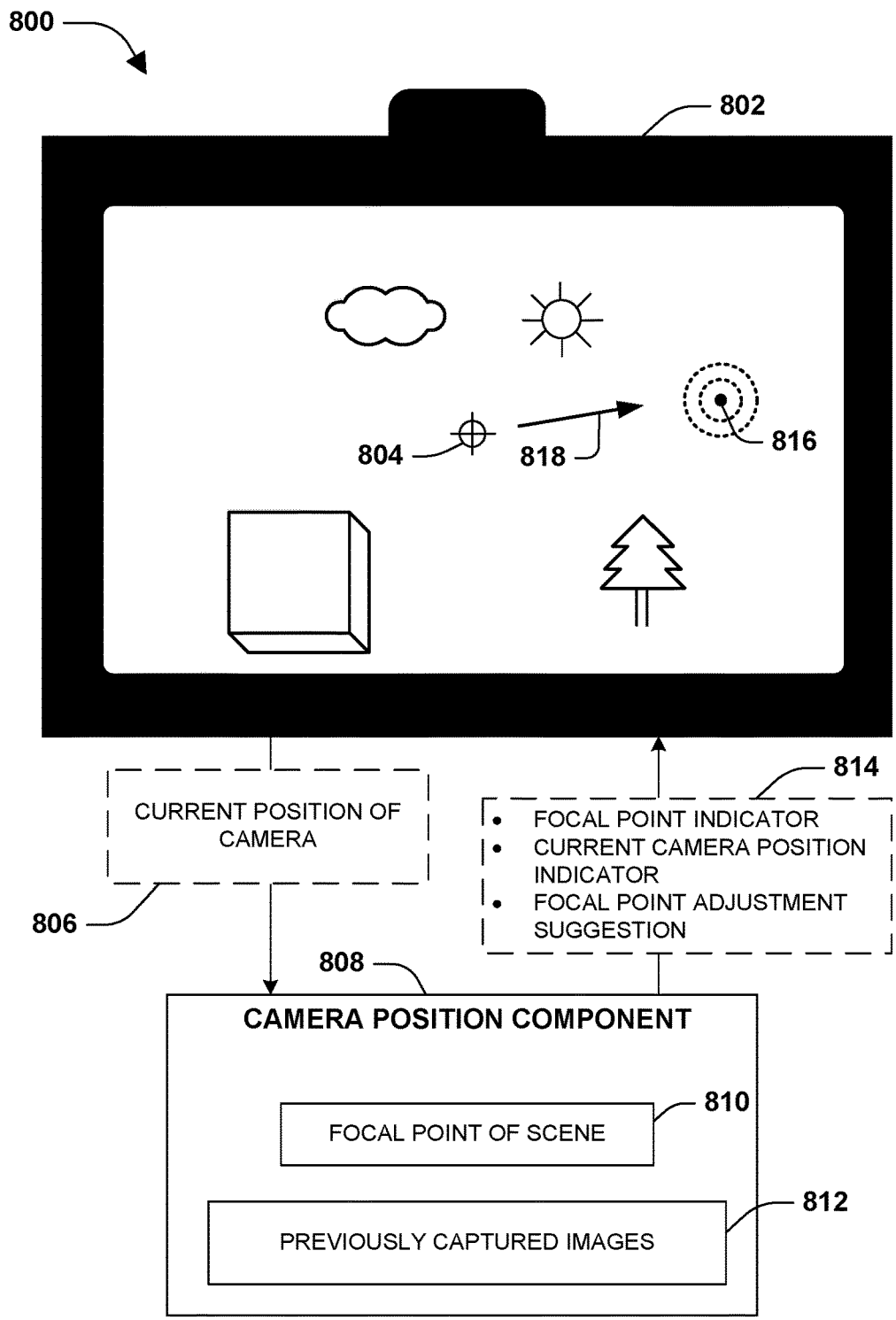
FIG. 8 is a component block diagram illustrating an exemplary system for providing a focal point indicator and/or a focal point adjustment suggestion for image capture.

FIG. 8 illustrates an example of a system 800 configured for providing a focal point indicator 816 and/or a focal point adjustment suggestion 818 for image capture. The system 800 may be associated with a camera 802 used to capture one or more images depicting a scene. The system 800 may comprise a camera position component 808. The camera position component 808 may have access to one or more previously captured images 812 of the scene. The camera position component 808 may guide the user in capturing a current image of the scene from a viewpoint corresponding to a focal point of the scene 810. For example, the camera position component 808 may compare a current position 806 of the camera 802 to the focal point of the scene 810. The camera position component 808 may be configured to provide 814 the focal point indicator 816, the focal point adjustment suggestion 818, and/or a current camera position indicator 804. The focal point adjustment suggestion 818 (e.g., an arrow, difference image and/or other user interface indicator) may aid the user in repositioning the camera 802 so that a current position of the camera 802 corresponds to the focal point of the scene 810 (e.g., such that the current camera position indicator 804 is aligned with the focal point indicator 816).

Figure 9:
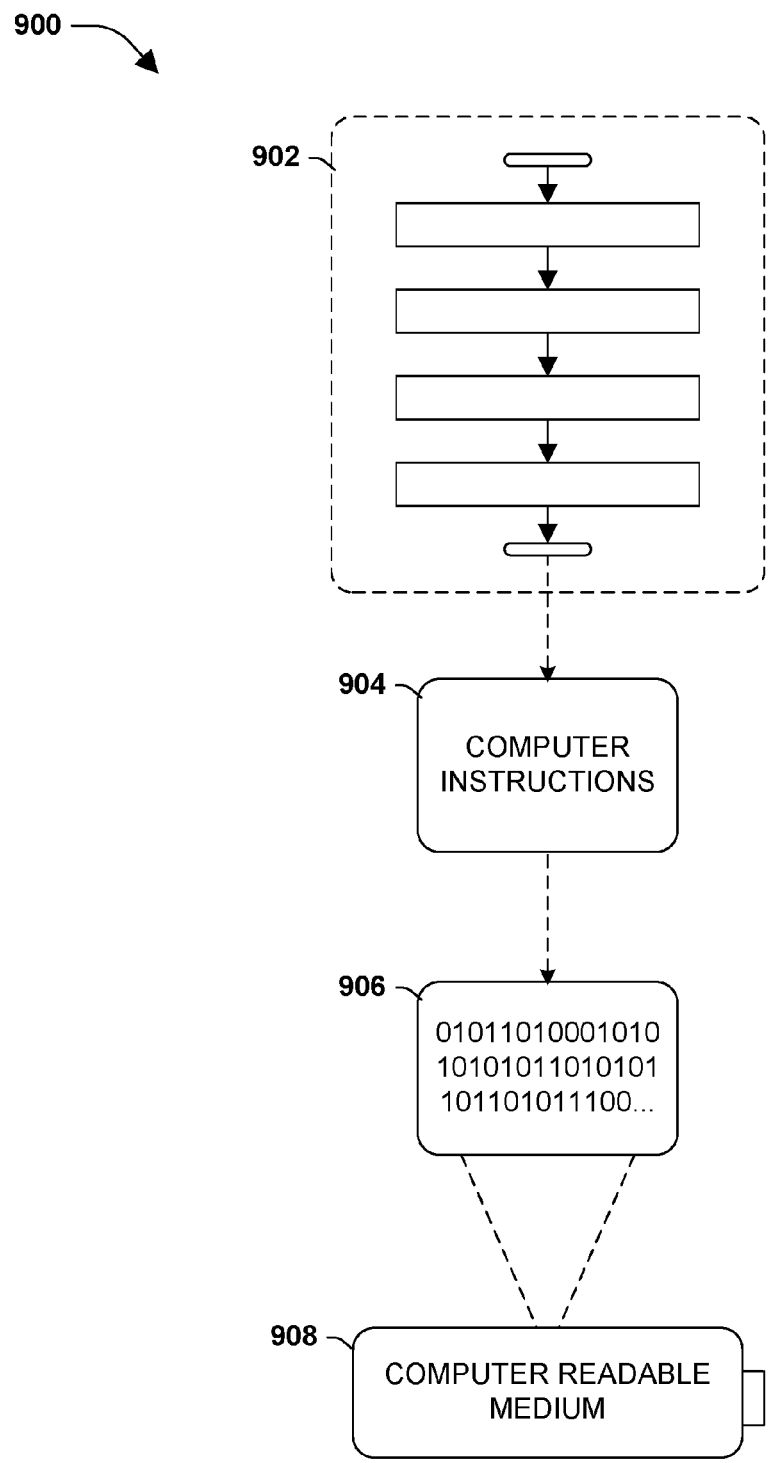
FIG. 9 is an illustration of an exemplary computing device-readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 100 of FIG. 1 and/or at least some of the exemplary method 600 of FIG. 6, for example. In some embodiments, the processor-executable instructions 904 are configured to implement a system, such as at least some of the exemplary system 200 of FIG. 2, at least some of the exemplary system 300 of FIG. 3, at least some of the exemplary system 400 of FIG. 4, at least some of the exemplary system 500 of FIG. 5, at least some of the exemplary system 700 of FIG. 7, and/or at least some of the exemplary system 800 of FIG. 8, for example. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component is localized on one computer or distributed between two or more computers.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
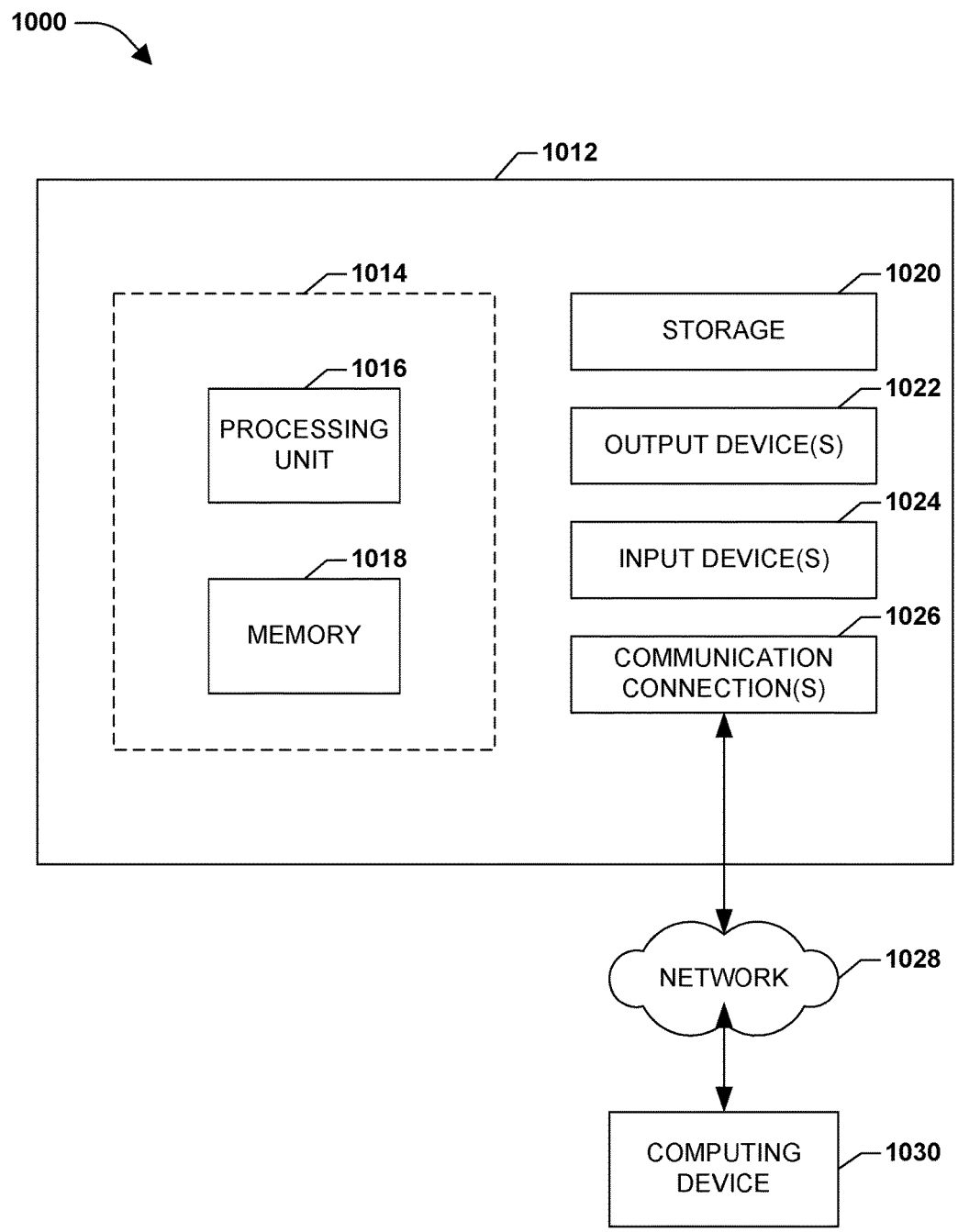
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only an example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions are implemented as program modules, such as functions, objects, Application Programming Interfaces (APIs), data structures, and the like, that perform particular tasks or implement particular abstract data types. Typically, the functionality of the computer readable instructions are combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. In some embodiments, depending on the exact configuration and type of computing device, memory 1018 is volatile, such as RAM, non-volatile, such as ROM, flash memory, etc., or some combination of the two. This configuration is illustrated in FIG. 10 by dashed line 1014.

In other embodiments, device 1012 includes additional features or functionality. For example, device 1012 also includes additional storage such as removable storage or non-removable storage, including, but not limited to, magnetic storage, optical storage, and the like. Such additional storage is illustrated in FIG. 10 by storage 1020. In some embodiments, computer readable instructions to implement one or more embodiments provided herein are in storage 1020. Storage 1020 also stores other computer readable instructions to implement an operating system, an application program, and the like. Computer readable instructions are loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media is part of device 1012.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1012 includes input device(s) 1024 such as keyboard, mouse, pen, voice input device, touch input device, infrared cameras, video input devices, or any other input device. Output device(s) 1022 such as one or more displays, speakers, printers, or any other output device are also included in device 1012. Input device(s) 1024 and output device(s) 1022 are connected to device 1012 via a wired connection, wireless connection, or any combination thereof. In some embodiments, an input device or an output device from another computing device are used as input device(s) 1024 or output device(s) 1022 for computing device 1012. Device 1012 also includes communication connection(s) 1026 to facilitate communications with one or more other devices.

Although the subject matter has been described in language specific to structural features and/or methodological acts, it is to be understood that the subject matter of the appended claims is not necessarily limited to the specific features or acts described above. Rather, the specific features and acts described above are disclosed as example forms of implementing the claims.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

It will be appreciated that layers, features, elements, etc. depicted herein are illustrated with particular dimensions relative to one another, such as structural dimensions and/or orientations, for example, for purposes of simplicity and ease of understanding and that actual dimensions of the same differ substantially from that illustrated herein, in some embodiments.

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A method for ordering images for panorama stitching, comprising:
   maintaining, by a computing device, an image stack comprising a plurality of existing images, the maintaining comprising:
   receiving a new image;
   responsive to the new image corresponding to a first ordering preference, adding the new image to a first region of the image stack having a higher stitching priority relative to a second region of the image stack;
   receiving an input corresponding to the new image indicating that the new image is to be moved to a lower stitching priority region in the image stack;

responsive to the received input, adding the new image to the second region of the image stack; and stitching, by the computing device, the new image and the plurality of existing images in the image stack according to a stitching priority assigned to each image of the image stack to generate the panorama.

2. The method of claim 1, wherein the first ordering preference provides stitching priority for an image captured later in time.

3. The method of claim 1, wherein the first ordering preference provides stitching priority based on foreground bias.

4. The method of claim 1, wherein the first ordering preference provides stitching priority based on background bias.

5. The method of claim 1, wherein the first ordering preference provides stitching priority based on an image being manually captured.

6. The method of claim 1, wherein the first ordering preference provides stitching priority based on an image being automatically captured.

7. The method of claim 1, wherein the received input is a user-provided manual input.

8. The method of claim 1, wherein each image associated with the first region of the image stack is stitched before each image associated with the second region of the image stack.

9. A system for ordering images for panorama stitching, the system comprising:
   a memory for storing executable program code; and
   a processor, functionally coupled to the memory, the processor being responsive to computer-executable instructions contained in the program code and operative to:
   store a plurality of existing images in an image stack;
   receive a new image;
   responsive to the new image corresponding to a first ordering preference, add the new image to a first region of the image stack having a higher stitching priority relative to a second region of the image stack;
   receive an input corresponding to the new image indicating that the new image is to be moved to a lower stitching priority region in the image stack;
   responsive to the received input, add the new image to the second region of the image stack; and
   stitch the new image and the plurality of existing images in the image stack according to a stitching priority assigned to each image of the image stack to generate a panorama.

10. The system of claim 9, wherein the first ordering preference provides stitching priority for an image captured later in time.

11. The system of claim 9, wherein the first ordering preference provides stitching priority based on foreground bias.

12. The system of claim 9, wherein the first ordering preference provides stitching priority based on background bias.

13. The system of claim 9, wherein the first ordering preference provides stitching priority based on an image being manually captured.

14. The system of claim 9, wherein the first ordering preference provides stitching priority based on an image being automatically captured.

15. The system of claim 9, wherein the received input is a user-provided manual input.

16. The system of claim 9, wherein each image associated with the first region of the image stack is stitched before each image associated with the second region of the image stack.

17. A computer-readable storage device comprising executable instructions, that when executed by a processor, assist with ordering images for panorama stitching, the computer-readable storage device including instructions executable by the processor for:
   storing a plurality of existing images in an image stack;
   receiving a new image;
   responsive to the new image corresponding to a first ordering preference, adding the new image to a first region of the image stack having a higher stitching priority relative to a second region of the image stack;
   receiving an input corresponding to the new image indicating that the new image is to be moved to a lower stitching priority region in the image stack;
   responsive to the received input, adding the new image to the second region of the image stack; and
   stitching the new image and the plurality of existing images in the image stack according to a stitching priority assigned to each image of the image stack to generate a panorama.

18. The computer-readable storage device of claim 17, wherein the received input is a user-provided manual input.

19. The computer-readable storage device of claim 17, wherein the first ordering preference provides stitching priority for an image captured later in time.

20. The computer-readable storage device of claim 17, wherein the first ordering preference provides stitching priority based on an image being manually captured.

* * * * *